Dec. 27, 1949        H. I. HAZZARD        2,492,283

HANDLE BAR STRUCTURE FOR MOTOR VEHICLES

Original Filed Sept. 9, 1946        2 Sheets-Sheet 1

INVENTOR:
HARRY I. HAZZARD
BY HIS ATTORNEYS
HARRIS, KIECH, FOSTER & HARRIS

Dec. 27, 1949   H. I. HAZZARD   2,492,283
HANDLE BAR STRUCTURE FOR MOTOR VEHICLES
Original Filed Sept. 9, 1946   2 Sheets-Sheet 2
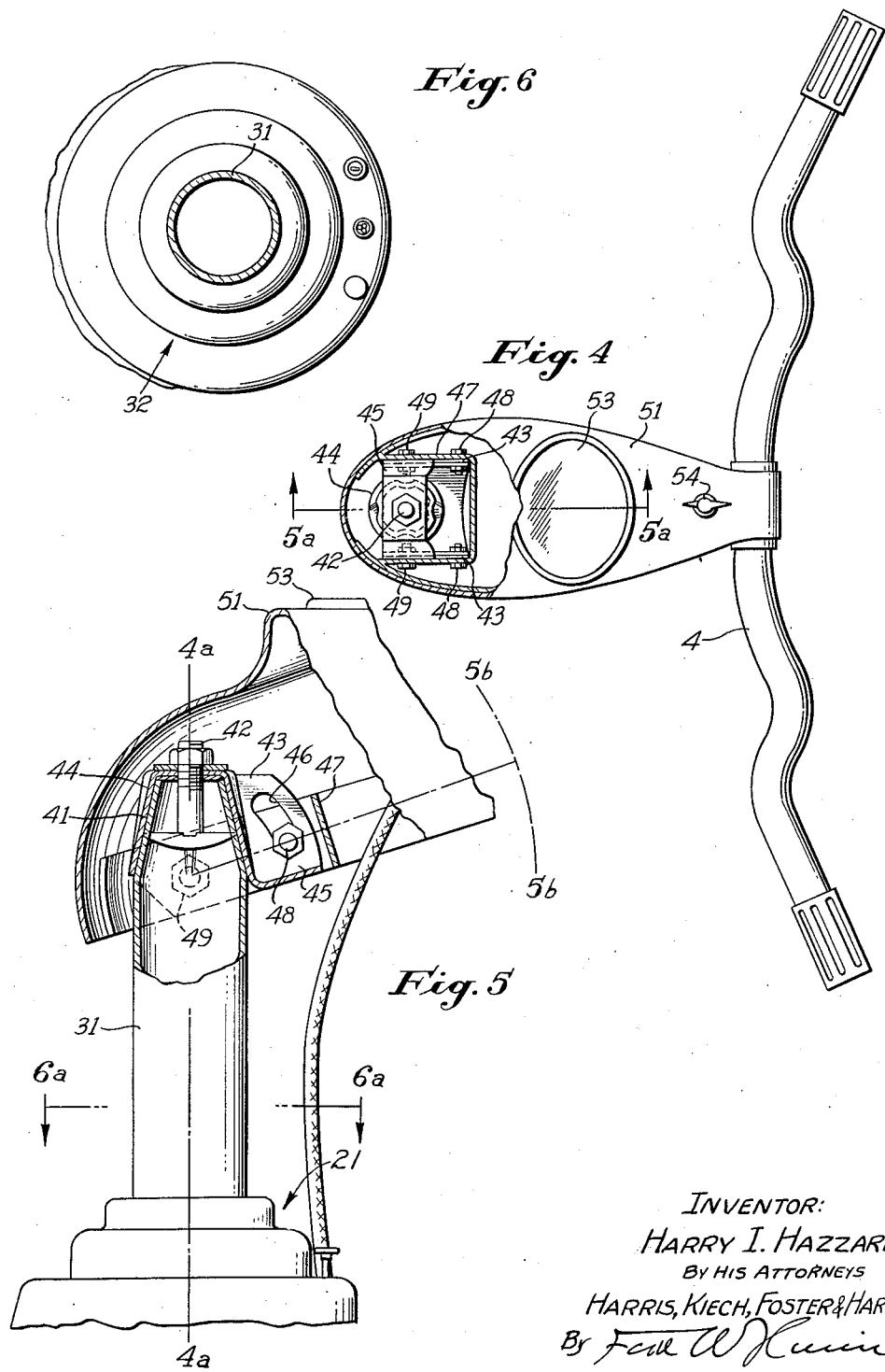
INVENTOR:
HARRY I. HAZZARD
BY HIS ATTORNEYS
HARRIS, KIECH, FOSTER & HARRIS Patented Dec. 27, 1949

2,492,283

UNITED STATES PATENT OFFICE 2,492,283

HANDLE BAR STRUCTURE FOR MOTOR VEHICLES

Harry I. Hazzard, Los Angeles, Calif., assignor to Salsbury Corporation, a corporation of California Original application September 9, 1946, Serial No. 695,592. Divided and this application April 28, 1947, Serial No. 744,351

7 Claims. (Cl. 74—551.1)

This invention relates to motor vehicles and has a special utility when applied to a motor driven bicycle or tricycle. The present application is a division of an application for Front end of a motor vehicle, Serial No. 695,592, filed September 9, 1946, of which I am co-applicant.

The vehicle hereinafter described may be called a motor driven bicycle, since it has two wheels, the rear wheel being driven by a motor and the front wheel being turned by handle bars to steer the vehicle. The wheels are smaller, however, than those ordinarily used on bicycles and are placed farther apart so that the rider may sit on a flat seat with his legs together and his feet resting on a flat surface.

The invention has for its objective, the provision of a novel handle bar structure for use in motor vehicles.

The advantages obtained by the use of this novel structure will be made evident hereinafter.

In the drawings;

Fig. 4 is an enlarged view, as seen from above, of the front portion of the handle bars and related parts, some of these parts being broken away or shown in section to better disclose internal parts;

Fig. 5 is a side view of some of the parts shown in Fig. 4, a portion thereof being broken away or shown in section on a plane represented by the line 5a—5a of Fig. 4 to better show the internal construction; and Fig. 6 is a section on a plane represented by the line 6a—6a of Fig. 5.

Figure 1:
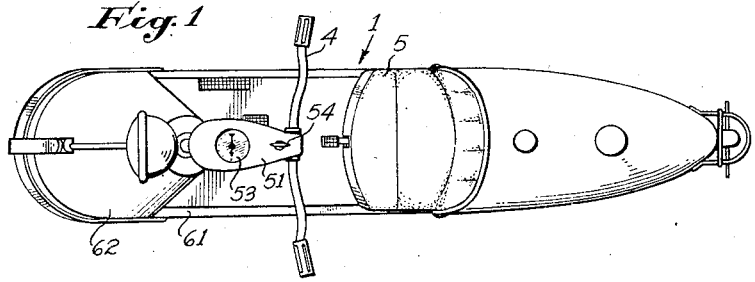
Fig. 1 is a view as seen from above the vehicle in which the invention is embodied.
Figure 2:
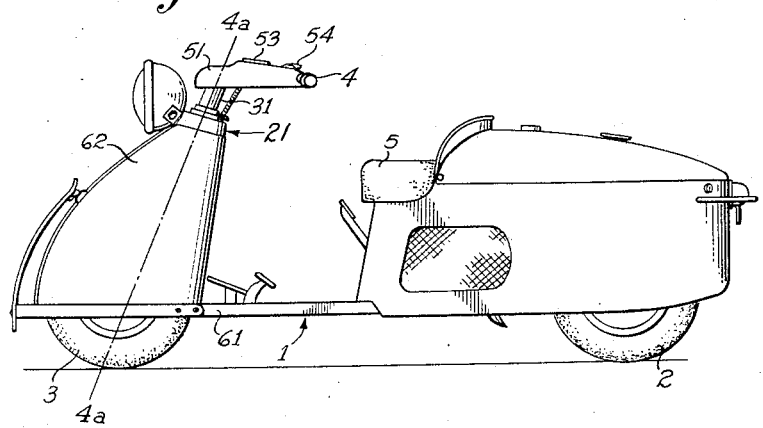
Fig. 2 is a side view of this vehicle.
Figure 3:
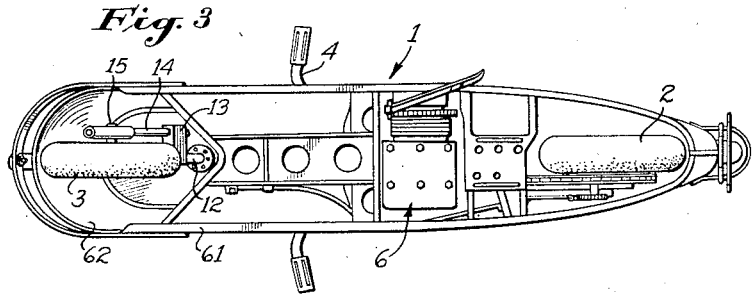
Fig. 3 is a view of this vehicle as seen from below the vehicle.

The present invention is best illustrated by disclosing its application to a motor driven bicycle, which is illustrated in the drawings, Figs. 1, 2, and 3 showing the complete vehicle. This vehicle consists of a body 1 supported on a rear wheel 2 and a front wheel 3, the vehicle being steered by handle bars 4 which turn about a steering axis indicated by the line 4a—4a in various figures. The driver sits upon a seat 5 with his feet on a flat support forming part of the body 1. The rear wheel 2 is driven by an engine 6 situated below and a little behind the seat 5. The engine is controlled by the driver by means forming no part of the invention claimed herein and therefore not described.

In the present improved motor vehicle, the front wheel 3 is rotatable on a wheel shaft or axle 15 which is carried at the lower end of a strut 14 which, in turn, is connected by an arm 13 to a steering shaft 12 (Fig. 3). The shaft 12 is splined at its upper end to a handle bar tube 31 and the shaft and tube are adapted to rotate as a unit in ball bearings (not shown) held in a bearing housing assembly 21. The assembly 21 is formed at the upper end of an outer cone member 62 which is attached to the forward end of the frame or chassis 61 of the vehicle and which partially encloses the front wheel as shown in Fig. 2. Thus, by turning the tube 31 and shaft 12 in the bearing assembly 21 the front wheel 3 may be turned to steer the vehicle in the desired direction.

The upper end of the tube 31 is coned as shown in Fig. 5, and is provided with splines 41. A step head carriage bolt 42 engages the inner surface of the cone, as shown, and projects upwardly beyond the tube 31 through a socket 44. The socket 44 is provided with splines complementary to the splines 41 and is a part of a hinge bracket 45, which has flat parallel sides 43 with arcuate slots 46 therein. The flat sides 43 are engaged by the flat sides of an inner head shell 47, and two bolts 48 pass through the parallel surfaces of the hinge bracket and the inner head shell 47, and, when tightened, hold the surfaces together frictionally with sufficient force to prevent relative movement therebetween under all conditions arising in the normal operation of the vehicle. Pivot bolts 49 also pass through the parallel surfaces of the hinge bracket 45 and the inner head shell 47, and, when the bolts 48 are loosened, the inner head shell 47 may turn about the bolts 49 along the arc 5b—5b, as shown in Fig. 5. The inner head shell 47 is welded or otherwise secured integrally to a handle bar shell 51 in which the handle bars 4 are rigidly secured. By loosening the bolts 48, the handle bars can be adjusted up or down in the arcuate path 5b—5b within limits imposed by the arcuate length of the slots 46, and by tightening the bolts 48 the handle bars 4 can be fixed in any position most satisfactory to the rider of the vehicle.

Mounted on the handle bar shell 51 are a speedometer 53 and a switch 54 by which the headlight and taillight are controlled and which also controls the ignition.

Certain advantages are gained by the particular form of handle bar used. It will be noted from reference to Fig. 4 that the handle bars 4 and the handle bar shell 51 form a T, the bottom of which rests on the axis 4a—4a, the handle bars and the handle bar shell turning about the axis 4a—4a. This allows the whole handle bar structure to clear a windshield (not shown). The handle bars 4, together with the shell 51, can also be raised or lowered by loosening the bolts 48, and locked in any position, within limits, to suit the convenience of the rider.

I claim as my invention:

1. In a vehicle of the class described, a handle bar structure, comprising: a steering shaft so mounted on the vehicle that it can turn about a rotative axis; a socket member fixed to said shaft and provided with pivots extending at right angles to the axis of said shaft; a shell member surrounding said socket member and pivotally mounted on said pivots to adapt it to be adjusted, within limits, angularly with respect to said rotative axis; means for locking said shell member to said socket member in different selected positions of adjustment; and handle bars carried by said shell member.

2. In a vehicle of the class described, a handle bar structure, comprising: a steering shaft so mounted on the vehicle that it can turn about a rotative axis; a socket member fixed to said shaft and provided with pivots extending at right angles to the axis of said shaft; a shell member overlying said socket member and having portions pivotally mounted on said pivots to adapt it to be adjusted, within limits, angularly with respect to said rotative axis; clamping means for locking said shell member to said socket member in different selected positions of adjustment; and handle bars carried by said shell member.

3. In a vehicle of the class described, a handle bar structure, comprising: a steering shaft so mounted on the vehicle that it can turn about a rotative axis; a socket member fixed to said shaft and provided with pivots extending at right angles to the axis of said shaft; an inner shell member pivotally mounted on said pivots to adapt it to be adjusted, within limits, angularly with respect to said rotative axis; means for locking said inner shell member to said socket member in different selected positions of adjustment; an outer shell member secured to and enclosing said inner shell member; and handle bars carried by said outer shell member.

4. In a vehicle of the class described, a handle bar structure, comprising: a steering shaft so mounted on the vehicle that it can turn about a rotative axis; a socket member fixed to said shaft and provided with pivots extending at right angles to the axis of said shaft, said socket member having laterally projecting side portions provided with arcuate slots; an inner shell member pivotally mounted on said pivots to adapt it to be adjusted, within limits, angularly with respect to said rotative axis; clamping means on said inner shell member engageable in said arcuate slots for clamping said inner shell member in different selected positions of adjustment; an outer shell member secured to and enclosing said inner shell member; and handle bars carried by said outer shell member.

5. In a vehicle of the class described, a handle bar structure, comprising: a steering shaft so mounted on the vehicle that it can turn about a substantially vertical rotative axis, said shaft being tapered at its upper end; a tapered socket member adapted to fit over said tapered end of said shaft; interengaging spline means on said tapered end and said socket member to connect said socket member and said shaft for unitary rotation; aligned pivot pins carried by said socket member and projecting therefrom at right angles to the axis of said steering shaft; an inner shell member pivotally mounted on said pivots to adapt it to be adjusted, within limits, angularly with respect to said rotative axis; means for locking said inner shell member to said socket member in different selected positions of adjustment; an outer shell member secured to and enclosing said inner shell member; and handle bars carried by said outer shell member.

6. In a vehicle of the class described, a handle bar structure, comprising: a steering shaft so mounted on the vehicle that it can turn about a substantially vertical rotative axis, said shaft being tapered at its upper end; a tapered socket member adapted to fit over said tapered end of said shaft; interengaging spline means on said tapered end and said socket member to connect said socket member and said shaft for unitary rotation; fastening means for fastening said socket member and said shaft together; aligned pivot pins carried by said socket member and projecting therefrom at right angles to the axis of said steering shaft; an inner shell member pivotally mounted on said pivots to adapt it to be adjusted, within limits, angularly with respect to said rotative axis; means for locking said inner shell member to said socket member in different selected positions of adjustment; an outer shell member secured to and enclosing said inner shell member; and handle bars carried by said outer shell member.

7. In a vehicle of the class described, a handle bar structure, comprising: a steering shaft so mounted on the vehicle that it can turn about a substantially vertical rotative axis; a socket member secured to the upper end of said shaft and provided with laterally projecting sides spaced from said shaft, said sides being provided at one end with aligned pivot means projecting laterally therefrom at right angles to the axis of said shaft and at the other end with arcuate slots arranged concentric with said pivot means; an inner shell member pivotally mounted on said pivot means to adapt it to be adjusted, within limits, angularly with respect to said rotative axis; means carried by said inner shell member and engageable in said slots for clamping said inner shell member to said socket member in different selected positions of adjustment; an outer shell member secured to and enclosing said inner shell member; and handle bars carried by said outer shell member.

HARRY I. HAZZARD.

REFERENCES CITED

The following references are of record in the file of this patent:

UNITED STATES PATENTS

| Number | Name | Date |
|---|---|---|
| 561,329 | Leonard | June 2, 1896 |
| 586,897 | Godfrey | July 20, 1897 |
| 609,690 | Mayerson | Aug. 23, 1898 |
| 671,647 | Field | Apr. 9, 1901 |
| 689,217 | Palmer | Dec. 17, 1901 |
| 1,367,500 | Sedman | Feb. 1, 1921 |
| 2,100,012 | Mankki | Nov. 23, 1937 |
| 2,114,733 | Anderson | Apr. 19, 1938 |
| 2,168,939 | Kraeft | Aug. 8, 1939 |
| 2,176,693 | Snell | Oct. 17, 1939 |
| 2,254,750 | Nerney | Sept. 2, 1941 |

FOREIGN PATENTS

| Number | Country | Date |
|---|---|---|
| 14,132 | Great Britain | Jan. 26, 1896 |
| 537,778 | France | May 30, 1922 |

Certificate of Correction

Patent No. 2,492,283 December 27, 1949

HARRY I. HAZZARD

It is hereby certified that error appears in the printed specification of the above numbered patent requiring correction as follows:

Column 4, line 64, list of references cited, for the name "Sedman" read *Redmon*; and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*